US010393904B2

United States Patent
Shahri et al.

(10) Patent No.: US 10,393,904 B2
(45) Date of Patent: Aug. 27, 2019

(54) PREDICTING STRESS-INDUCED ANISOTROPY EFFECT ON ACOUSTIC TOOL RESPONSE

(71) Applicant: Weatherford Technology Holdings, LLC., Houston, TX (US)

(72) Inventors: Mojtaba Pordel Shahri, Houston, TX (US); Jennifer Anne Market, Tomball, TX (US); Mohammadreza Safariforoshani, Houston, TX (US); Ovunc Mutlu, Pearland, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 250 days.

(21) Appl. No.: 14/934,922

(22) Filed: Nov. 6, 2015

(65) Prior Publication Data

US 2017/0131421 A1    May 11, 2017

(51) Int. Cl.
*G01V 1/50* (2006.01)
*G01V 1/22* (2006.01)
*E21B 47/14* (2006.01)
*G01V 99/00* (2009.01)
*E21B 41/00* (2006.01)
*E21B 43/26* (2006.01)

(52) U.S. Cl.
CPC ............... *G01V 1/50* (2013.01); *E21B 47/14* (2013.01); *E21B 41/0092* (2013.01); *E21B 43/26* (2013.01)

(58) Field of Classification Search
CPC ....................... G01V 1/50; E21B 47/14; E21B 43/26; E21B 41/0092
See application file for complete search history.

(56) References Cited

U.S. PATENT DOCUMENTS 4,701,891 A * 10/1987 Castagna ................. G01V 1/46
367/29
5,510,582 A * 4/1996 Birchak ................. G10K 11/16
181/102
(Continued)

OTHER PUBLICATIONS

Fang et al. ,An approach for predicting stress-induced anisotropy around a borehole, Jun. 2013, p. 143-150.*
(Continued)

*Primary Examiner* — Mohammad K Islam
(74) *Attorney, Agent, or Firm* — Blank Rome, LLP (57) ABSTRACT

Predicting downhole acoustic tool responses due to stress-induced anisotropy by performing at least the following: receiving a plurality of input data corresponding to at least one well site comprising a wellbore; constructing a three-dimensional geomechanical model based at least in part on the input data; creating at least one near field versus far field stress distribution that corresponds to the wellbore from the three-dimensional geomechanical model; creating, at least one near wellbore versus far-field velocity distribution using the at least one near field versus far field stress distribution; comparing the downhole acoustic tool response property that indicates a downhole acoustic tool's penetration depth for a subsurface geological formation with the near wellbore velocity fields; and flagging, where the downhole acoustic tool response property stays within the near-wellbore velocity field.

22 Claims, 8 Drawing Sheets

(56) References Cited

U.S. PATENT DOCUMENTS

| | | | | |
|---|---|---|---|---|
| 6,208,585 | B1* | 3/2001 | Stroud | G01V 13/00 367/14 |
| 2002/0195276 | A1* | 12/2002 | Dubinsky | E21B 44/005 175/40 |
| 2004/0257911 | A1* | 12/2004 | Tang | G01V 1/44 367/81 |
| 2006/0285437 | A1* | 12/2006 | Sinha | G01V 1/50 367/37 |
| 2007/0030761 | A1* | 2/2007 | Donald | G01V 1/284 367/75 |
| 2007/0285274 | A1* | 12/2007 | Esmersoy | E21B 21/08 340/853.5 |
| 2008/0319675 | A1* | 12/2008 | Sayers | G01V 1/50 702/11 |
| 2009/0070042 | A1* | 3/2009 | Birchwood | G01V 1/50 702/11 |
| 2009/0084176 | A1* | 4/2009 | Hassan | E21B 47/08 73/152.57 |
| 2009/0213692 | A1* | 8/2009 | Martinez | G01V 1/28 367/52 |
| 2011/0134720 | A1* | 6/2011 | Bratton | G01V 1/44 367/35 |
| 2012/0163123 | A1* | 6/2012 | Moos | G01V 1/50 367/31 |
| 2012/0239363 | A1* | 9/2012 | Durrani | E21B 43/00 703/10 |
| 2013/0275099 | A1* | 10/2013 | Frydman | G06F 17/5009 703/2 |
| 2014/0043938 | A1* | 2/2014 | Sinha | G01V 1/50 367/31 |
| 2014/0305638 | A1* | 10/2014 | Kresse | E21B 47/00 166/250.1 |
| 2014/0365420 | A1* | 12/2014 | Jocker | G01V 1/48 706/52 |
| 2015/0032270 | A1* | 1/2015 | Gattu | F15B 19/005 700/282 |
| 2015/0055438 | A1* | 2/2015 | Yan | G01V 1/282 367/73 |
| 2015/0084782 | A1* | 3/2015 | Zhang | G01V 1/44 340/853.2 |
| 2015/0168697 | A1* | 6/2015 | Ogata | G02B 15/173 359/684 |
| 2015/0177198 | A1* | 6/2015 | Thierry | G01V 1/44 166/253.1 |
| 2015/0177405 | A1* | 6/2015 | Jannin | G01V 1/48 702/6 |
| 2015/0301214 | A1* | 10/2015 | Moos | G01V 1/50 367/31 |
| 2016/0061021 | A1* | 3/2016 | Shaposhnikov | E21B 47/0005 367/35 |
| 2016/0103238 | A1* | 4/2016 | van Kuijk | E21B 47/0005 702/11 |
| 2016/0146956 | A1* | 5/2016 | Ounadjela | G01V 1/145 367/143 |
| 2016/0370499 | A1* | 12/2016 | Berard | G01V 11/00 |
| 2017/0090052 | A1* | 3/2017 | Udengaard | G01V 1/282 |
| 2017/0115420 | A1* | 4/2017 | Cazeneuve | G01V 1/50 |

OTHER PUBLICATIONS

Fang et al., Simulation of the effect of stress-induced anisotropy on borehole compressional wave propagation, Jun. 2014, p. 205-216.*
Fang et al. ,An approach for predicting stress-induced anisotropy around a borehole (Year: 2013).*
Fang et al., Simulation of the effect of stress-induced anisotropy on borehole compressional wave propagation (Year: 2014).*

* cited by examiner

PREDICTING STRESS-INDUCED ANISOTROPY EFFECT ON ACOUSTIC TOOL RESPONSE

TECHNICAL FIELD

Embodiments described herein generally relate to data analysis of geological subsurface formations, and in particular for interpreting responses of downhole acoustic tools that collect well data and are susceptible to influences from one or more wellbore characteristics.

BACKGROUND OF THE DISCLOSURE

Geological influences from subsurface geologic rock formations can impact the design and successful completion of oil, gas, and/or other type of hydrocarbon-based fuel extraction wells. Knowledge of geologic rock formation parameters can be helpful in designing and implementing development projects that include determining wellbore stability design, fracture modeling, and production optimization. For instances, collecting well-related information, such as information found in well logs, improves an operator's understanding of the subsurface geologic rock formation's mechanical properties, anisotropy behavior, and stress orientation. Operators may use the well-related information to plan and design the different phases of a well, for example, efficiently planning fracturing operations for a well. Specifically, subsurface stress and fractures that affect fluid flow may naturally occur in underground areas where oil and gas operators may be interested in recovering hydrocarbon resources. By determining the variations in naturally occurring stress fields, operators may be able to develop and optimize hydraulic fracture designs.

Naturally occurring subsurface stress occur typically because of the resulting weight of overlying rock layers and/or stress caused from rock formation confinement. The stresses experienced at the subsurface level are typically compressive, anisotropic, and nonhomogeneous. In other words, underground geologic rock formations typically experience compressive stresses on the rock formations that are not equal and the magnitude of the stress is based on direction. When an operator excavates the underlying rock formation, such as drilling a wellbore through the subsurface, the excavation process routinely alters the stress fields of the rock formations near the excavation site. In particular, an operator's drilling of a wellbore notably alters the near-wellbore stress fields when compared to the far wellbore stress field. As a result, a variety of acoustic downhole measuring tools that an operator may use to measure and provide data concerning the wellbore may produce data that becomes distorted because of the altered near-wellbore stress fields. Characterizing the effects of the altered near-wellbore stress fields may be helpful in accurately analyzing recorded downhole acoustic tool.

SUMMARY OF THE DISCLOSURE

In one embodiment, a machine readable medium on which instructions are stored, comprises instructions that when executed cause a machine for predicting downhole acoustic tool responses to perform at least the following: receive a plurality of input data corresponding to at least one well site comprising a wellbore, construct a geomechanical model based at least in part on the input data, create at least one near field versus far field stress distribution that corresponds to the wellbore, create at least one near wellbore versus far-field velocity distribution based at least in part on the at least one near field versus far field stress distribution, compare the at least one near field versus far field velocity distribution with at least one downhole acoustic tool response property that indicates a downhole acoustic tool's penetration depth for a subsurface geological formation, and flag areas where the downhole acoustic tool response property stays within a near-wellbore velocity field that is determined from at least one near field versus far field stress distribution.

In another embodiment, a system for predicting downhole acoustic tool responses is disclosed. The system comprises: at least one processor; and a memory, coupled to at least one processor, and comprises instructions, when executed by at least one processor causes the system to: receive a plurality of input data corresponding to at least one well site comprising a wellbore, construct a geomechanical model based at least in part on the input data, determine a plurality of near-wellbore stress fields and a plurality of far-field stress fields that correspond to the wellbore based at least in part on the geomechanical model, determine a plurality of near-wellbore velocity fields and far-field velocity fields based at least in part on the near-wellbore stress fields and far-field stress fields, compare the near-wellbore velocity fields with at least one downhole acoustic tool response property that specifies a distance on how far an downhole acoustic tool measures into a subsurface geological formation and detect areas where the near-wellbore velocity fields exceed the downhole acoustic tool response property.

In yet another embodiment, a method for predicting downhole acoustic tool responses. The method is implemented using a specially programmed computing system and comprises the steps of receiving a plurality of input data corresponding to at least one well site comprising a wellbore, constructing a three-dimensional geomechanical model based at least in part on the input data creating at least one near field versus far field stress distribution that corresponds to the wellbore from the three-dimensional geomechanical model, creating at least one near wellbore versus far-field velocity distribution using the at least one near field versus far field stress distribution, comparing the at least one near field versus far field velocity distribution with at least one downhole acoustic tool response property that indicates a downhole acoustic tool's penetration depth for a subsurface geological formation; and flagging areas where the downhole acoustic tool response property stays within a near-wellbore velocity field that is determined from at least one near field versus far field velocity distribution.

These and other features will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION OF THE DISCLOSURE

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

As used herein, the term "computing system" can refer to a single computing device that includes, but is not limited to a single computer, host, virtual machine (VM), server, network device, and/or mobile device, such as a smartphone, tablet, and/or other smart devices, or a plurality of computing devices working together to perform the function described as being performed on or by a computing system.

Unless otherwise specified within the disclosure, the terms "far field" and "in-situ" are considered synonymous and may be interchanged throughout this disclosure.

Unless otherwise specified within the disclosure, the terms "wellbore" and "borehole" are considered synonymous and may be interchanged throughout this disclosure.

Disclosed herein are various embodiments that provide wellbore acoustic data interpretation analysis by quantifying the effects of stresses on acoustic downhole measuring tools, such as acoustic Logging While Drilling (LWD) tools and acoustic tools used during wireline operation. In one embodiment, an acoustic data interpretation tool may receive well input data that pertains to one or more well characteristics that include, but are not limited to the wellbore, reservoir, and acoustic downhole measuring tool properties. The acoustic data interpretation tool may construct a geomechanical model using the received well input data relating to well and/or reservoir characteristics and use the geomechanical model to compute near field versus (vs.) far field stress distributions. The acoustic data interpretation tool may subsequently create near wellbore vs. far-field velocity distributions based on the near field vs. far field stress distribution. To provide velocity distribution around the wellbore, the acoustic data interpretation tool may perform an acousto-elastic analysis, which is subsequently used to generate a synthetic acoustic velocity distribution near the wellbore. The acoustic data interpretation tool may compare the near field vs. far field acoustic velocities distributions with one or more downhole acoustic tool response properties, such as depth of investigation and flag areas where the DOI overlap the near-wellbore perturbed stress field. The acoustic data application may perform the analysis for different wellbore geometries or reservoir intervals to produce an operation guideline (e.g., look up tables) for future wells plans that an operator may use when drilling in the same general region or play.

Figure 1:
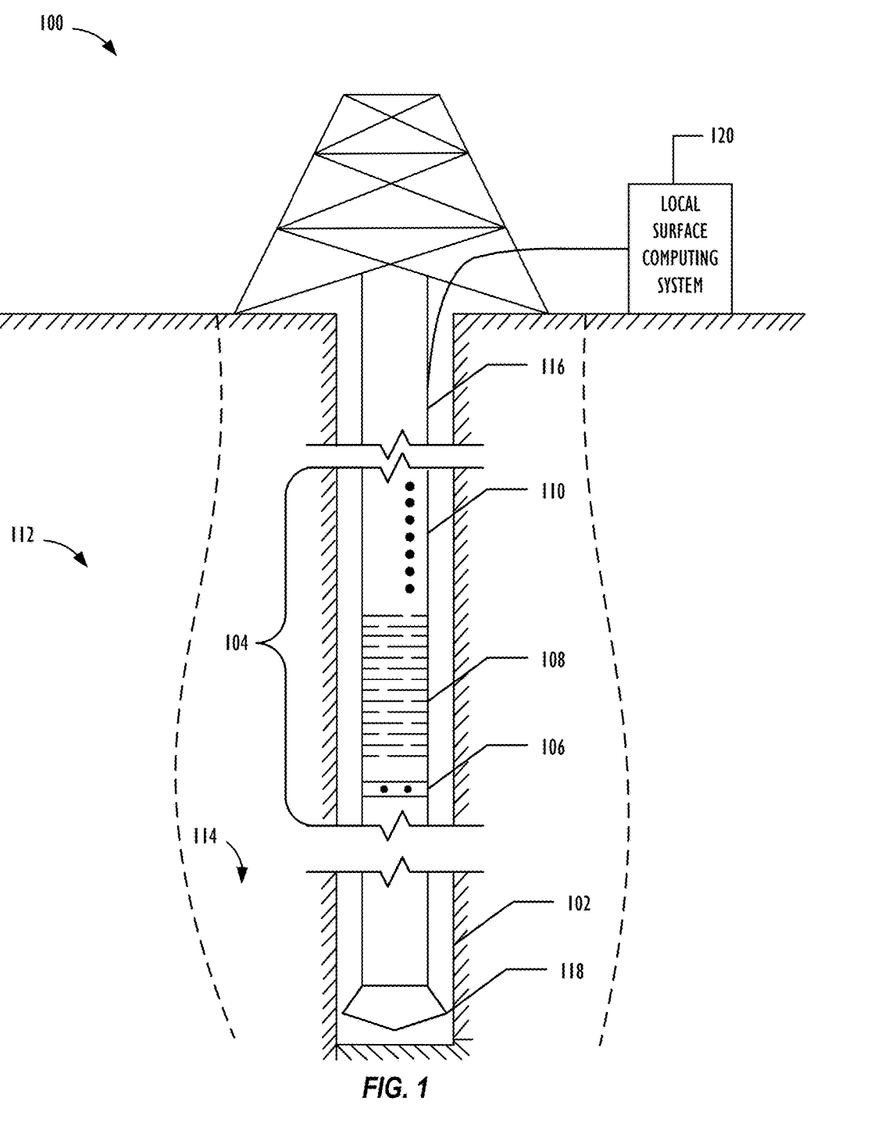
FIG. 1 is a schematic diagram of an embodiment of a hydrocarbon well system at a well site, where embodiments of the present disclosure may operate herein.

FIG. 1 is a schematic diagram of an embodiment of a hydrocarbon well system 100 at a well site, where embodiments of the present disclosure may operate herein. The hydrocarbon well system 100 may comprise a wellbore 102, a drill string 116, and a drill bit 118 located at the well site. Operators of the hydrocarbon well system 100 may suspend the drill string 116 within the wellbore 102 to drill a vertical and/or horizontal wellbore. The drill string 116 may be adapted to perform a variety well drilling functions that include, but are not limited to transmitting power, controlling the drill bit 118, and/or conducting fluid and/or cuttings. The drill bit 118 may be located at the bottom end of the drill string 116 and configured to drill and break apart the subsurface geological formations to form wellbore 102. Hydrocarbon well system 100 may rotate the drill string 116 and the drill bit 118 using a variety of power transmission techniques, such as using a rotary table drive that couples to a kelly or using one or more top drive devices when forming wellbore 102. In one embodiment, operators of the hydrocarbon well system 100 may form the wellbore 102 for exploration and recovery of hydrocarbon based fuels.

The drill string 116 may comprise a plurality of data-gathering downhole tools, such as measurement while drilling (MWD) and LWD tools. FIG. 1 illustrates that an acoustic LWD tool 104 may be incorporated within the drill string 116. The acoustic LWD tool 104 may comprise a transmitter section 106, an attenuator section 108, and a receiver section 110. In one embodiment the acoustic LWD tool 104 may be adapted to be an azimuthal sonic tool that provide sonic measurements and azimuthal sonic borehole images. As the drill string 116 rotates, the transmitter section 106 may generate a plurality of acoustic waves (e.g., a sequence of acoustic waves) that transmit into the subsurface geological formations. The acoustic waves may reflect back to the receiver section 110 producing data that the acoustic LWD tool 104 stores into orientation azimuthal bins. By processing the azimuthal bins, the waveforms produce azimuthally oriented images of compressional and refracted shear images. The attenuator section 108 may be adapted to attenuate acoustic noise propagating along the drill string.

The acoustic LWD tool's 104 response may depend on a variety of downhole condition, such as formation acoustic properties and acoustic tool response properties that represent the tool's DOI. For example, the acoustic LWD tool's 104 DOI specify how far an acoustic LWD tool 104 measures into the subsurface geological formations from the acoustic LWD tool 104 and/or from the wellbore. The operating frequency of the acoustic LWD tool 104 may be one of the factors that affect the DOI of acoustic LWD tool 104. Other well drilling factors that may affect the DOI of acoustic LWD tool 104 could also include, but are not limited to the subsurface geological formation acoustic characteristics, mud properties, source type, tool geometry, and/or wellbore trajectory (e.g., inclination and azimuth of the wellbore). Generally, acoustic LWD tool 104 that operate at low frequencies and in fast and/or relatively harder subsurface geological formations are less sensitive to near-wellbore stress field perturbations compared to acoustic LWD tools 104 that operate at high frequencies and in slow and/or relatively softer subsurface geological formations. For example, under the same stress field conditions, relatively higher frequency (e.g., about 10-20 kilohertz (kHz)) tools may be more sensitive to near-wellbore stress field perturbations while relatively lower frequency (e.g., about 1-3 kHz) acoustic tools can capture far-field stress conditions and are less sensitive to near-wellbore stress field perturbations. Configuring the acoustic LWD tool 104 to generate acoustic signals using a broad range of frequencies (e.g., a range of about 1-20 kHz) allows for measuring near field and far field wellbore stress perturbations to more fully characterize the anisotropy of the stress fields. Other embodiments of the hydrocarbon well system 100 may use an acoustic tool during wireline operations instead of an acoustic LWD tool 104.

FIG. 1 illustrates two zones of interest in relation to the wellbore within the subsurface geological formations. One zone of interest is the near-wellbore stress zone 114 and the other area of interest is the far field stress zone 112. Persons of ordinary skill in the art are aware that the properties of near-wellbore stress zone 114 (e.g., extent of zone) may be based on a variety of formation properties that include, but are not limited to the far-field stress field, wellbore geometry, and/or wellbore trajectory. In particular, different formation properties may affect the extent, the magnitude, the degree of anisotropy, and/or the orientation of the near-wellbore stress fields within the near-wellbore stress zone 114. Based on the formation properties and independent of the acoustic LWD tool's 104 response properties (e.g., DOI), a geomechanical stress analysis can quantify the characteristics of the relationship between the far field stress zone 112 and the near field stress zone 114. As shown in FIG. 1, the near-wellbore stress zones 114 may vary depending on the depth of the subsurface. A nonlinear elastic model for acoustic waves in pre-stressed medium may be employed to calculate stress induced anomalies caused from the near-wellbore stress zones 114. Specifically, stress tensor affects the velocity of the acoustic waves by varying amounts depending on material nonlinearity. A Fourier transformed elastic wave equation (e.g., a Christoffel equation) may be solved at different locations and/or depths around a wellbore to account for the near-wellbore stress zones 114.

FIG. 1 also illustrates a local surface computing system 120 located at the well site. The local surface computing system 120 may receive, monitor, and manage data received from the downhole measuring tools incorporated into the drill string 116. For example, the local surface computing system 120 may receive measurement data, such as transit time or slowness of downhole formations, in real-time from the acoustic LWD tool 104 and/or while drilling the wellbore 102. In one embodiment, the measurement data may be obtained from the acoustic LWD tool's 104 well log that provides wellbore images indicating compressional and shear waveforms and rock formation mechanical properties.

The local surface computing system 120 may also be configured to receive well input data from other types of measurement tools, such as pore pressure and/or inclination and azimuth of the wellbore. Using the received well input data, the local surface computing system 120 may be able to produce operational guidelines, such as lookup tables, for the acoustic LWD tool 104 by constructing a geomechanical model, determining near field vs. far field stress distributions, determining near field vs. far field velocity distributions, determining areas that may be affected by near-wellbore stress fields, and/or flagging areas where near-wellbore stress field perturbations affect acoustic LWD tool 104. The creation of operational guidelines are discussed in more detail in method 300 shown in FIG. 3.

As persons of ordinary skill in the art are aware, although FIG. 1 illustrates a specific hydrocarbon well system 100, the disclosure is not limited to that application and/or the specific embodiment illustrated FIG. 1. For instance, embodiments of the present disclosure may include, in addition to the local surface computing system 120, a remote computing system connected to the well site via a communication network (e.g., Internet, local area network, and/or wide area network) that creates operational guidelines and/or flags areas where near-wellbore stress field perturbations affect acoustic measurements. In other embodiments, the remote computing system may operate in conjunction with the local surface computing system 120 to create operational guidelines and/or flag areas where near-wellbore stress field perturbations affect acoustic LWD tool 104 and/or other types of acoustic downhole measuring tools. Additionally, the hydrocarbon well system 100 may be implemented as a land-based drilling operation and/or offshore drilling operation. Furthermore, in other embodiments, the hydrocarbon well system 100 may be implemented as a variety of other well types, such as geothermal wells. The use and discussion of FIG. 1 is only an example to facilitate ease of description and explanation.

Figure 2:
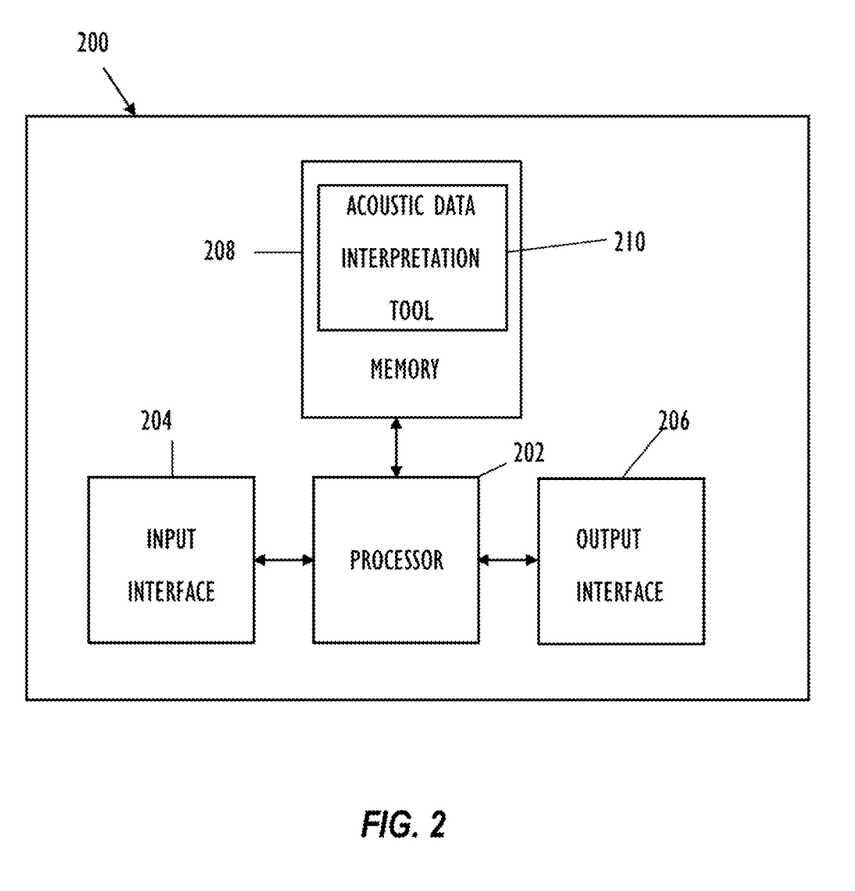
FIG. 2 is a schematic diagram of an embodiment of a computing system that specializes in predicting the effects of stress induced anisotropy on acoustic downhole measuring tools.

FIG. 2 is a schematic diagram of an embodiment of a computing system 200 that specializes in predicting the effects of stresses on acoustic downhole measuring tools and may correspond to or may be part of a computer and/or any other computing device. The computing system 200 may be implemented as a workstation, server, mainframe, super computer, and/or portable computing device. Using FIG. 1 as an example, the computing system 200 may be or part of the local surface computing system 120. The computing system 200 comprises a processor 202, which may be also be referenced as a central processor unit (CPU). The processor 202 may communicate (e.g., via a system bus) and/or provide instructions to other components within the computing system 200, such as the input interface 204, output interface 206, and/or memory 208. In one embodiment, the processor 202 may comprise one or more multi-core processors and/or memory media (e.g., cache memory) that function as buffers and/or storage for data. Additionally, processor 202 may be part of one or more other processing components, such as application specific integrated circuits (ASICs), field-programmable gate arrays (FPGAs), and/or digital signal processors (DSPs). Although FIG. 2 illustrates that processor 202 may be a single processor, processor 202 is not so limited and instead may represent a plurality of processors. The processor 202 may be configured to implement any of the methods described herein, which include method 300 as described in FIG. 3.

FIG. 2 illustrates that memory 208 may be operatively coupled to processor 202. Memory 208 may be a non-transitory medium configured to store various types of data. For example, memory 208 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 2, the memory 208 may be used to house the instructions for carrying out various embodiments described herein. In an embodiment, the memory 208 may comprise an acoustic data interpretation tool 210 that may be accessed and implemented by processor 202. Additionally or alternatively, acoustic data interpretation tool 210 may be stored and accessed within memory embedded in processor 202 (e.g., cache memory). The acoustic data interpretation tool 210 may be configured to provide computer executable instructions used for providing an accurate characterization of the near-wellbore stress fields that potentially impact a downhole acoustic tool response. The acoustic data interpretation tool 210 may be implemented using method 300 as described in FIG. 3 that produce one or more outputs shown in FIGS. 4-8. In one embodiment, memory 208 may interface with a system bus (e.g., a computer bus) so as to communicate and/or transmit information stored in memory 208 to processor 202 during execution of software programs, such as software applications that comprise program code, and/or computer executable process steps that incorporate functionality described herein (e.g., the acoustic data interpretation tool 210).

Persons of ordinary skill in the art are aware that software programs may be developed, encoded, and compiled in a variety computing languages for a variety software platforms and/or operating systems and subsequently loaded and executed by processor 202. In one embodiment, the compiling process of the software program, (e.g., the acoustic data interpretation tool 210), may transform program code written in a programming language to another computer language such that the processor 202 is able to execute the programming code. For example, the compiling process of the software program may generate an executable program that provides encoded instructions (e.g., machine code instructions, threads, and/or processes) for processor 202 to accomplish specific, non-generic, particular computing functions, such as constructing a geomechanical model and comparing the output from the geomechanical model with one or more downhole acoustic tool response properties that represent a tool's DOI.

After the compiling process, the acoustic data interpretation tool 210 may then be loaded as computer executable instructions or process steps to processor 202 from storage (e.g., memory 208, storage medium/media, removable media drive, and/or other storage device) and/or embedded within the processor 202. Processor 202 can execute the stored instructions or process steps in order to perform instructions or process steps (e.g., the acoustic data interpretation tool 210) to transform the field development computing system 200 into a non-generic, particular, specially programmed machine or apparatus. Stored data, e.g., data stored by a storage device, can be accessed by processor 202 during the execution of computer executable instructions or process steps to instruct one or more components within the field development computing system 200.

Alternatively, rather than programming and/or loading executable instructions onto memory 208 and/or processor 202 to form a non-generic, particular machine or apparatus, persons of ordinary skill in the art are aware that stored instructions may be converted and implemented as hardware customized for a particular use. In one embodiment, implementing instructions, such as constructing a geomechanical model and comparing the output form the geomechanical model with one or more downhole acoustic tool response properties that represents a tool's DOI, can be converted to a hardware implementation by well-known design rules. For example, the compiling process of the software program, (e.g., the acoustic data interpretation tool 210) may build a sequence of instruction bits that control and arrange a sequence of control gate-level components that write data onto buses, into latches and registers, across channels, memory, and/or other components of the processor 202 and/or memory 208. The compiling of the acoustic data interpretation tool 210 may produce gate-level components with fixed relationships designed to accomplish specific, non-generic, particular computing functions.

The decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or other application specific hardware that hardwires the instructions or process steps of the software. In the same manner as a machine controlled by a new ASIC is a non-generic, particular, specially programmed machine or apparatus, likewise a computing device (e.g., a computer) that has been programmed and/or loaded with executable instructions or process steps (e.g., the acoustic data interpretation tool 210) should be viewed as a non-generic, particular, specially programmed machine or apparatus.

Figure 3:
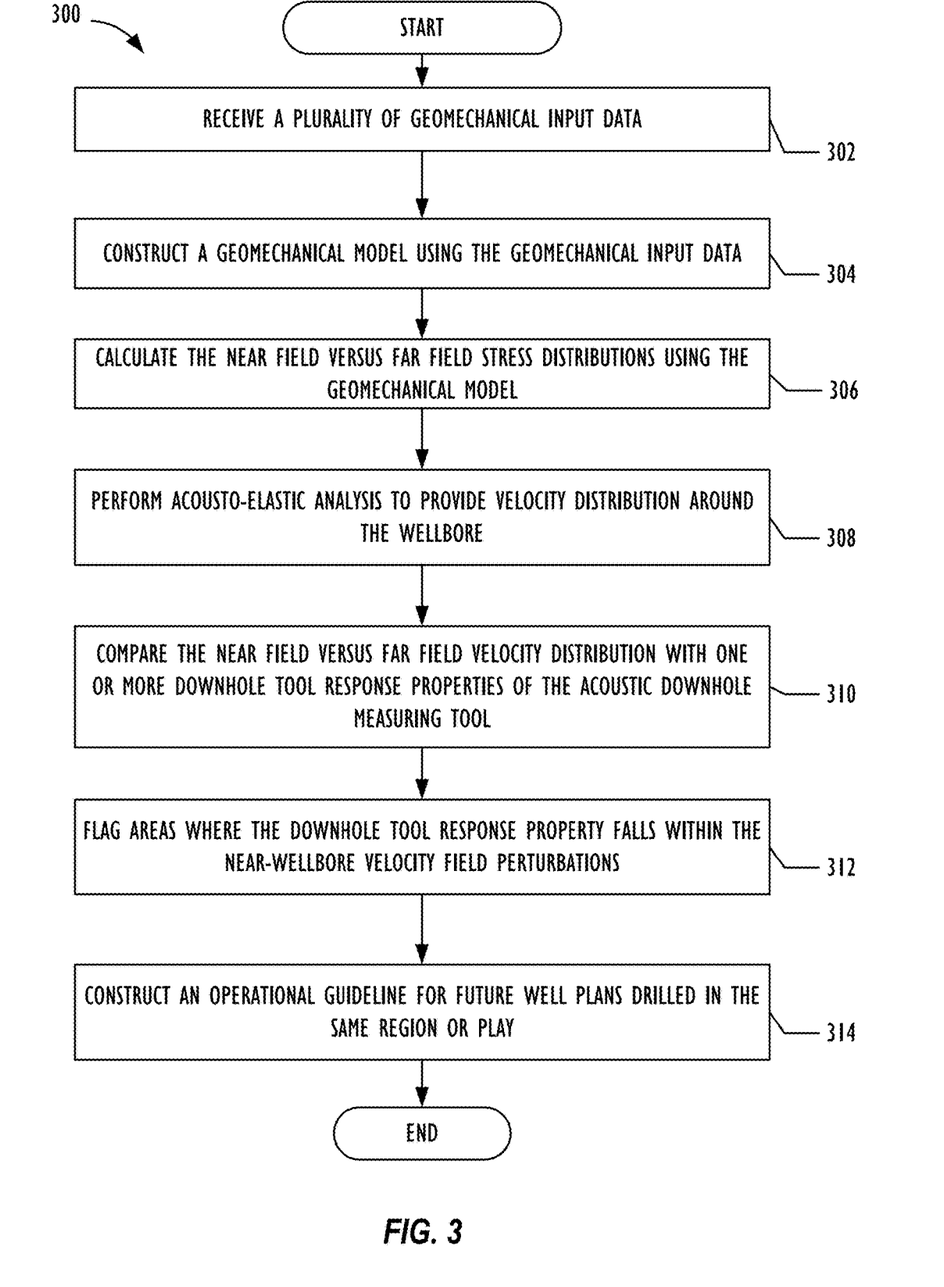
FIG. 3 is a flow chart of an embodiment of a method that improves acoustic data interpretation where stress induced anisotropy affects a downhole acoustic tool response.

FIG. 2 also illustrates that the processor 202 may be operatively coupled to an input interface 204 configured to receive geomechanical input data, and output interface 206 configured to output and/or display one or more of the method steps shown in FIG. 3 and/or the operation guidelines. The input interface 204 may be configured to obtain the geomechanical input data via cables, connectors, wireless connections and/or other communication protocols. In one embodiment, the input interface 204 may be a network interface that comprises a plurality of ports configured to receive and/or transmit data via a network. In particular, the network interface may transmit the seismic data via wired links, wireless link, and/or logical links. Other examples of the input interface 204 may be universal serial bus (USB) interfaces, CD-ROMs, DVD-ROMs and/or connections to one or more seismic receivers. The output interface 206 may include, but is not limited to one or more connections for a graphic display (e.g., monitors), a graphical user interface (GUI), a printing device that produces hard-copies of the generated results, and/or a plurality of ports that transmit data via cables, connectors, wireless connections, and/or other communication protocols.

Persons of ordinary skill in the art are aware that the computing system 200 may comprise other components well known in the art, such as sensors and/or power sources not explicitly shown in FIG. 2. For ease of discussion, FIG. 2 may exclude other common or typical computing system components known by persons of ordinary skill in the art to process well-related information.

FIG. 3 is a flow chart of an embodiment of a method 300 that improves acoustic data interpretation where near wellbore stresses affects a downhole acoustic tool measurements. Using FIG. 1 or 2 as an example, method 300 may be implemented using the local surface computing system 120, computing system 200, and/or any other specialized computing system configured to process geomechanical data relating to well construction and/or a wellbore. In one embodiment, method 300 may be implemented using Matlab to host the algorithms associated with method 300 and a GUI to execute the different steps in method 300. Persons of ordinary skill in the art are aware that other embodiments of method 300 may be implemented using other technical coding languages and/or interactive environments typically used by engineers and other skill artisans. Implementation of method 300 using even a generic computing system transforms the generic computing system into a specialized computing system that performs the specialize function of predicting the effects of near wellbore stresses on acoustic downhole measuring tools.

Method 300 may start a block 302 and receives a plurality of well input data. Well input data may be any type of well data that include, but are not limited to wellbore geometry, reservoir and geomechanical properties, tool type, and/or downhole tool response properties, such as DOI. Method 300 may receive the well input data from a variety of downhole measuring tools, preexisting well data, and/or from other computing systems and/or databases that store the information relating to the well development project and/or wellbore. For scenarios where there is a limited well input data, a rock property database may be used to provide any additional information for constructing a geomechanical model.

Method 300 then moves to block 304 and constructs a geomechanical model using the well input data. Method 300 may implement a variety of well-known modelling techniques that convert well input data into geomechanical properties used to construct the geomechanical model. For example, method 300 may use similar techniques to construct the geomechanical model found in other well applications, such as well stimulation methods (e.g., hydraulic fracturing) and/or wellbore stability. The geomechanical model may determine the sigma maximum values or the maximum horizontal stress and/or sigma minimum values or the minimum horizontal stress at different points along a wellbore. At block 304, method 300 may produce a relatively more accurate solution and/or geological interpretation of the subsurface stress fields depending on the types of well input data supplied to method 300. Table 1 and Table 2 that are shown below provide examples of the types of well input data that method 300 may use to construct the geomechanical model.

Table 1 illustrates an embodiment of the type of well input data and examples of the sources that method 300 that method 300 may use to construct the geomechanical model at block 304. As shown in Table 1 below, the type of well input data includes well inclination, well azimuth, vertical stress, minimum horizontal stress ($Sh_{min}$), maximum horizontal stress ($SH_{max}$), pore pressure, and Poisson's ratio, from a variety of different sources. In particular, pore pressure may be obtained from sonic and/or resistivity logs, repeat formation test (RFT) tool and/or a modular dynamics test (MDT) tool. The sonic logs may be received in real-time and/or from adjacent offset wells.

TABLE 1

| Stress Module | |
|---|---|
| Desired Data | Source (e.g.) |
| Inclination/Azimuth | Wellbore Survey |
| Vertical Stress | Density/Sonic Log |
| Minimum Horizontal Stress | Leak-off Test |

TABLE 1-continued

| Stress Module | |
|---|---|
| Desired Data | Source (e.g.) |
| Maximum Horizontal Stress (Magnitude/Direction) | World Stress Map/Image Log |
| Pore Pressure | Sonic/Resistivity Logs, MDT, RFT |
| Poisson's Ratio | Sonic Log |

In one embodiment, method 300 may use additional well input data to improve the construction of the geomechanical model at block 304. Other types of well input data may be obtained from other geomechanical analysis, such as plasticity, horizontal transverse isotropic (HTI) and/or vertical transverse isotropy (VTI) formation, poro-elastic effect, and/or thermo-elastic effect that may improve the construction of the geomechanical model. For example, method 300 may determine the plasticity of the subsurface geological formation by analyzing cohesion and frictional anisotropy (FA).

Method 300 then continues to block 306 to calculate the near field stress distributions using the geomechanical model. At block 306, method 300 converts the in situ stress field to the near-wellbore stress. Persons of ordinary skill in the art are aware that variety of techniques may be used to convert in situ stress field, and/or other related geomechanical properties to near-wellbore stresses. In one embodiment, method 300 may use a Kirsch linear elastic solution to perform the conversion. In another embodiment, method 300 may calculate the near field stress distributions using the geomechanical model by accounting for a variety of other factors, such as pressure dependent effects, time dependent effects, and/or chemical dependent effects. For example, method 300 may use a relatively more complex solution than the Kirsch linear elastic solution, such as a transient, thermo-elastic solution.

Method 300 may then move to block 308 to perform an acousto-elastic analysis that provides acoustic velocity distribution around the wellbore using the near field stress distributions. By performing the acousto-elastic analysis, method 300 may describe how the acoustic velocities, such as shear wave velocities, of the subsurface geological formation change because of the near-wellbore stress field. Method 300 may perform the acousto-elastic analysis using well-known quick look analytical solutions that use math techniques to generate the acoustic velocity distribution around the wellbore and/or using numerical methods to generate the acoustic velocity distribution around the wellbore by importing the stress field from the geomechanical model into a numerical model. In both the quick look analytical solution and the numerical model analysis, non-linear stiffness coefficients could be received from available data (e.g., labs and/or cores) or can be selected from a global rock property data base or remote computing system. In one embodiment, method 300 may perform the acousto-elastic analysis with non-linear elastic constants, such as the non-linear elasticity theory as described in Hughes, D. S. and J. L. Kelly, *Second-Order Elastic Deformation of Solids.* Physical Review, 1953. 92(5): p. 1145-1149 and Thurston, R. N. and K. Brugger, *Third-Order Elastic Constants and the Velocity of Small Amplitude Elastic Waves in Homogeneously Stressed Media.* Physical Review, 1964. 133(6A): p. A1604-A1610, both of which are herein incorporated by reference as if reproduced in its entirety. Method 300 produce synthetic stress and velocity outputs that can be plotted along the wellbore based on the acousto-elastic analysis. The plots could be based on continuous log curves or may be implemented in a discrete manner and for different zones along the wellbore.

Method 300 may proceed to block 310 and compare the near field vs. far field velocity distribution with one or more downhole tool response properties of the acoustic downhole measuring tool. Specifically, at block 310, method 300 may compare the extent of the near wellbore stress field to a specific downhole tool response for an acoustic downhole measuring tool. In one embodiment, the specific downhole tool response properties could be the DOI of the acoustic downhole measuring tool. Method 300 may then continue to block 312 and flag areas where the downhole tool response property falls within the near-wellbore velocity field perturbations for further analysis. For example, method 300 may flag areas where the near-wellbore velocity field perturbations exceeds the DOI range for a downhole acoustic tool. Flagging areas where the downhole tool response property falls within the near-wellbore velocity field perturbations will be discussed in more detail in FIGS. 6 and 7.

Afterwards, method 300 may move to block 314 and construct an operational guideline for future well plans drilled in the same region or play. To construct the operational guidelines, method 300 may repeats blocks 302-312 for a plurality of different scenarios where one or more geomechanical properties differ. For example, blocks 302-312 may be repeated for different wellbore geometries or reservoir intervals and may be presented as lookup tables, which is described in more detail in FIG. 8.

Figure 4:
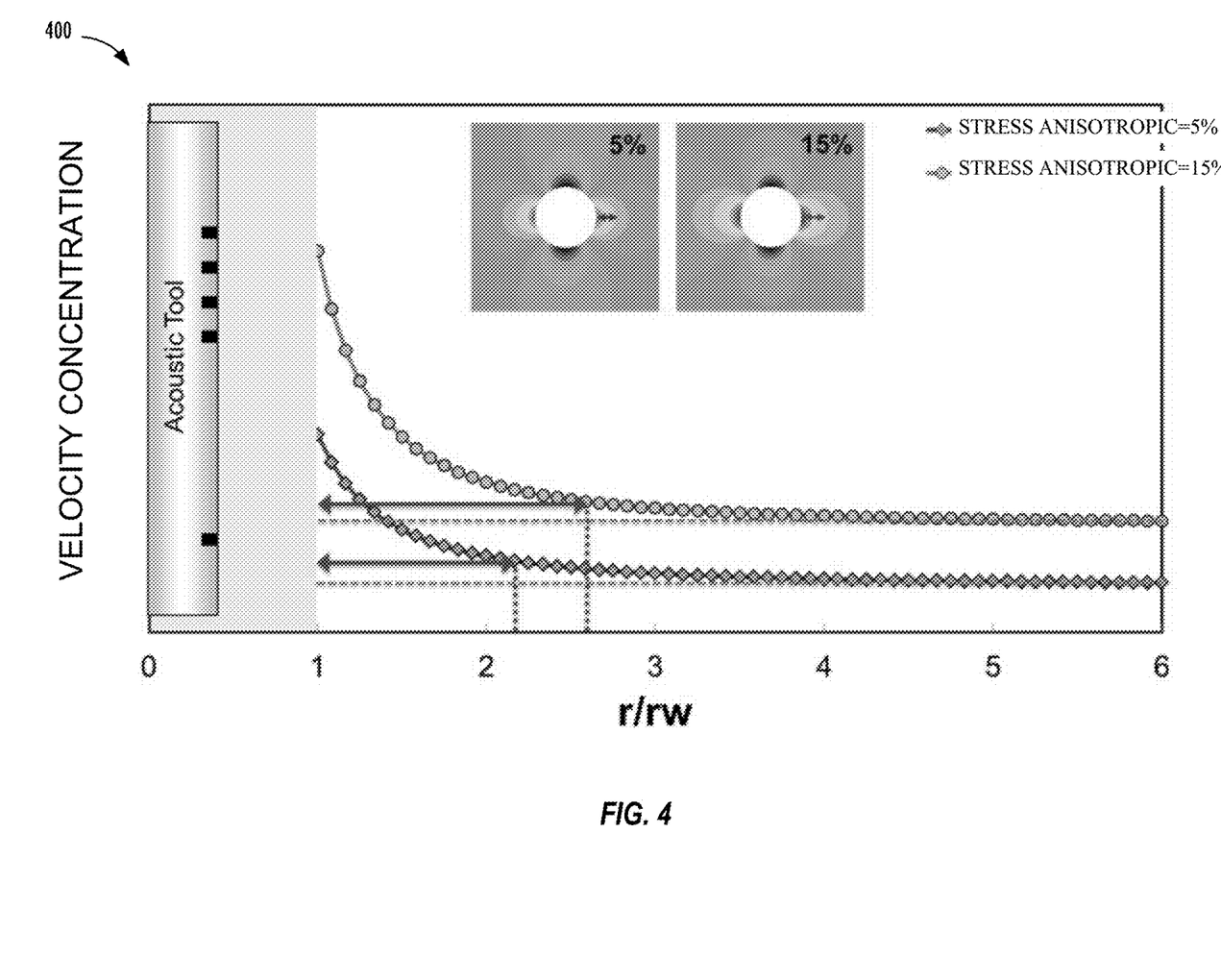
FIG. 4 is an illustration of an embodiment of a graphical output of near-wellbore stress concentrations around a wellbore under two different far-field stress conditions.

FIG. 4 is an illustration of an embodiment of a graphical output 400 of near-wellbore velocity concentrations around a wellbore under two different far-field velocity conditions. In one embodiment, the graphical output 400 may be displayed on a GUI of a computing system as an output of block 308 of method 300. The X-axis represents the radial extent into the formation normalized by the wellbore radius as defined in equation 1:

$$r_n = r/r_w \tag{1}$$

where $R_n$ represents the normalized wellbore radius, r represents the wellbore radius, and $r_w$ represents the radius from the well axis. The Y-axis represents the velocity magnitude. As shown in FIG. 4, the near-wellbore decays and reaches the far field value at a distance of about 2.2 times the normalized wellbore radius for about five percent in-situ velocity anisotropy and at about 2.6 times the normalized wellbore radius for about fifteen percent in-situ velocity anisotropy. FIG. 4 illustrates that the in-situ velocity state changes the extent and varies the near wellbore velocity field and can be quantified independently of a downhole acoustic tool response.

As an example relating to FIG. 4, for about a five percent in-situ velocity anisotropy with about an 8.5 inch wellbore, the non-perturbed zone would begin about 1.5 feet (ft) into the subsurface geological formation. An acoustic downhole measuring tool operating at a low frequency signal of about 2 kHz in a 100 microsecond per feet (μs/ft) formation would see approximately 5 ft away from the wellbore, and thus could be expected to measure the nonperturbed velocity fields or far field velocity fields. For the same formation and wellbore, if the acoustic downhole measuring tool is instead operating at high frequency signal of about 10 kHz, the acoustic downhole measuring tool would be able to measure about 1 ft into the formation, and thus may be affected by the near-wellbore velocity perturbed zone.

Figure 5:
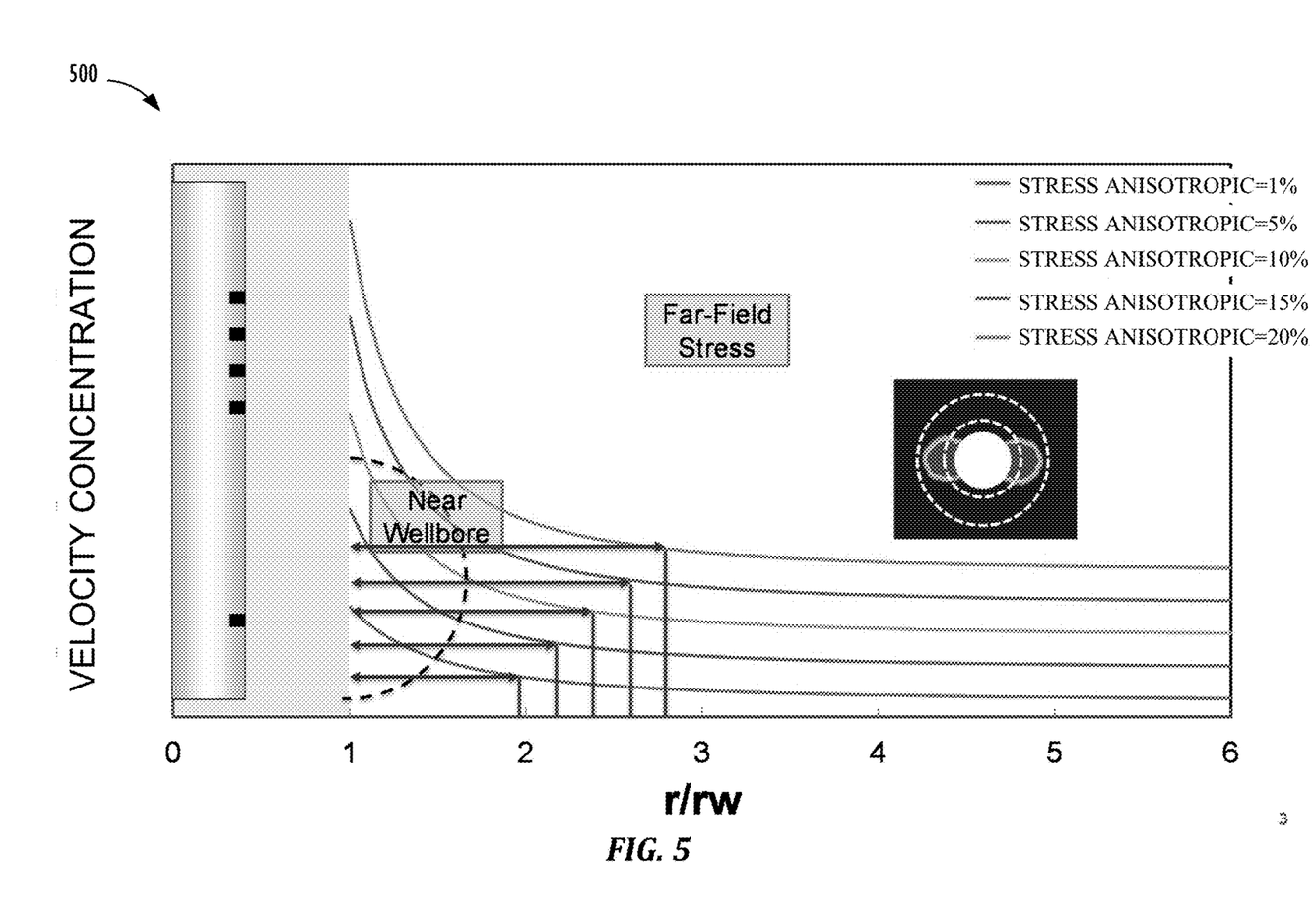
FIG. 5 is an illustration of an embodiment of a graphical output of near-wellbore stress concentrations around a wellbore under five different far-field stress conditions.

FIG. 5 is an illustration of an embodiment of a graphical output 500 of near-wellbore velocity concentrations around a wellbore under five different far-field velocity conditions. Similar to the graphical output 400 shown in FIG. 4, the graphical output 500 in FIG. 5 may be displayed on a GUI of a computing system as an output of block 308 of method 300. As shown in FIG. 5, the near-wellbore velocity zone may vary depending on the degree of in-situ velocity anisotropy. Similar to FIG. 4, as the degree of in-situ velocity anisotropy increases, so does the near-wellbore velocity zone. In particular, near-wellbore field velocity concentration extends to at about 1.95 times the normalized wellbore radius for about one percent in-situ velocity anisotropy; about 2.2 times the normalized wellbore radius for about five percent in-situ velocity anisotropy; about 2.4 times the normalized wellbore radius for about ten percent in-situ velocity anisotropy; about 2.6 times the normalized wellbore radius for about fifteen percent in-situ velocity anisotropy; and about 2.8 times the normalized wellbore radius for about twenty percent in-situ velocity anisotropy.

Figure 6:
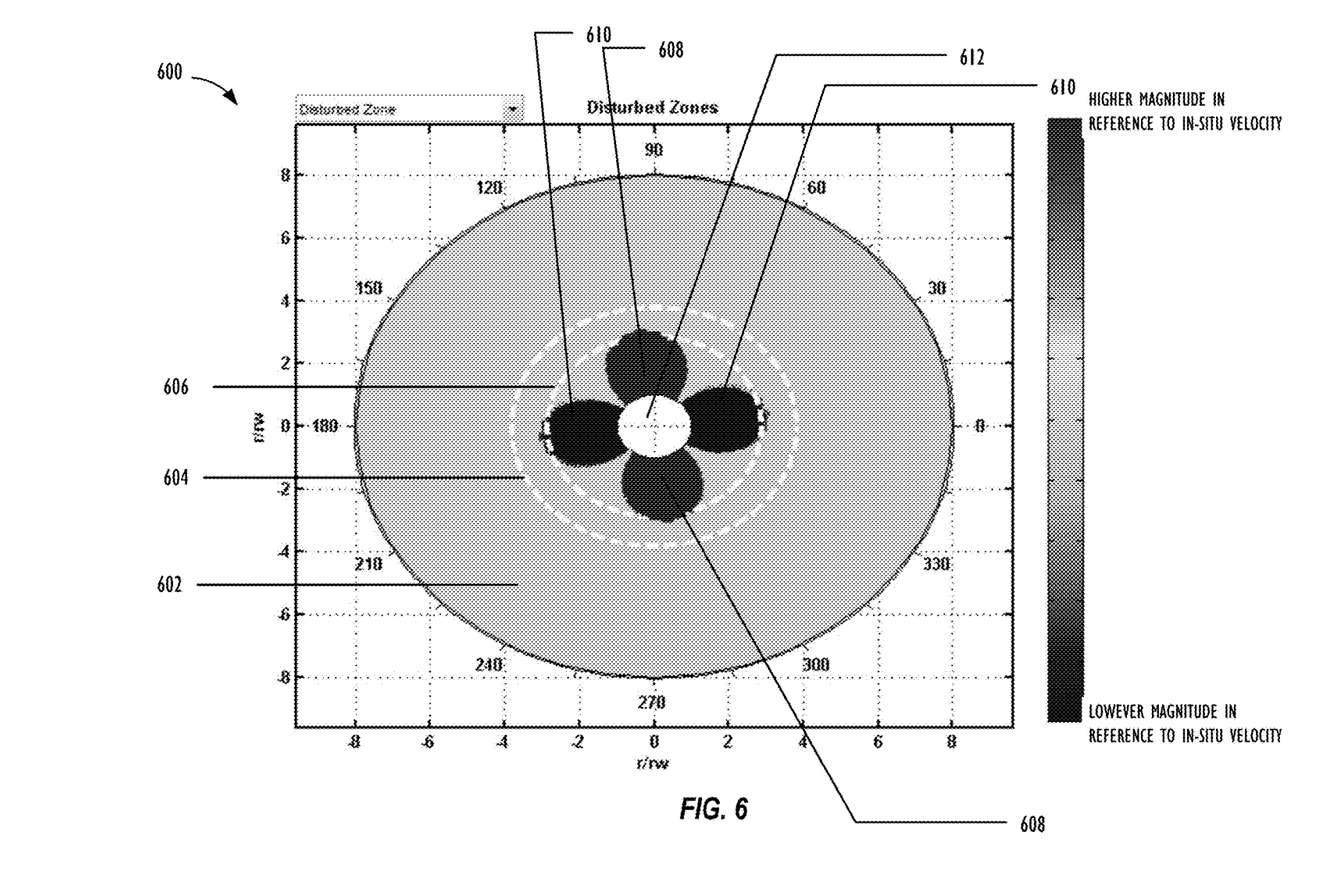
FIG. 6 is an illustration of an embodiment of a depth of investigation (DOI) vs. near-wellbore perturbed stress zone output display at a single depth
Figure 7:
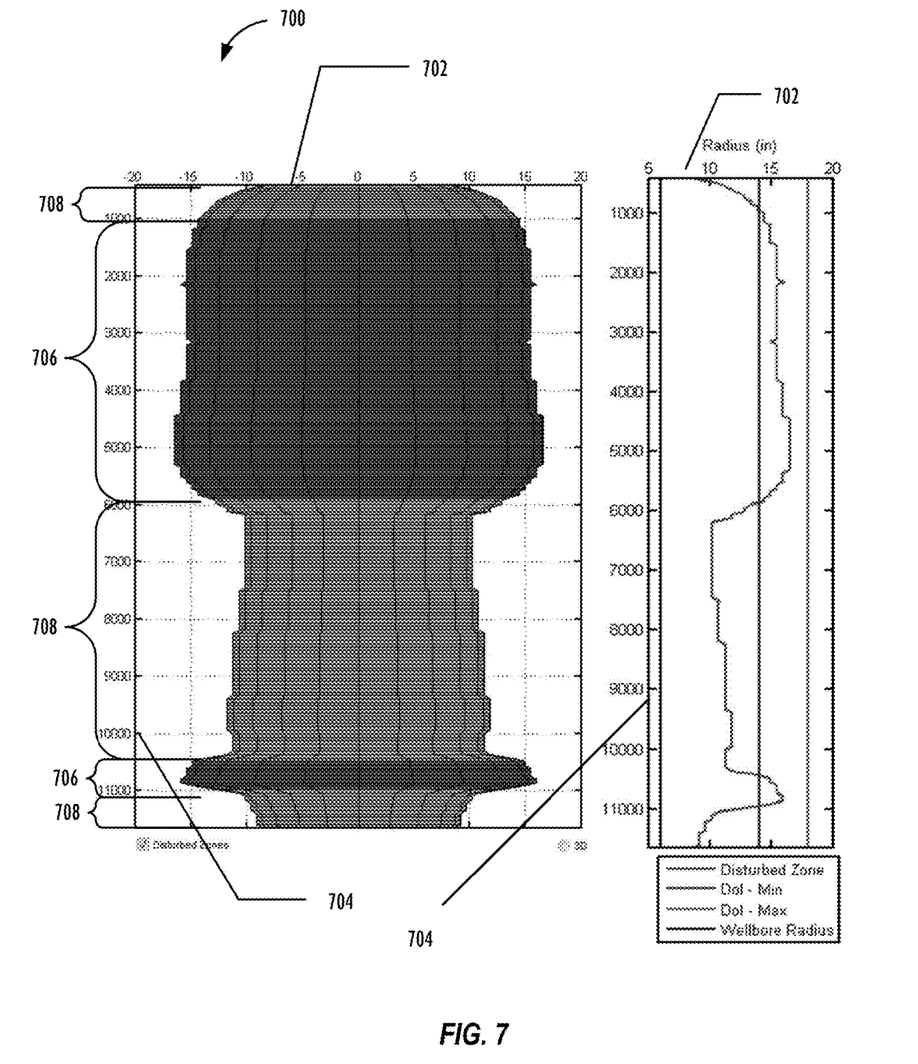
FIG. 7 is an illustration of an embodiment of a DOI vs. near-wellbore perturbed stress zone output display at multiple depths.

FIG. 6 is an illustration of an embodiment of a DOI vs. near-wellbore perturbed velocity zone output display 600 at a single depth. In one embodiment, the DOI vs. near-wellbore perturbed velocity zone output display 600 may be displayed on a GUI of a computing system as an output of block 310 of method 300. In FIG. 7, the wellbore 612 is bordered by near-wellbore velocity concentration zones 608 and 610 that represent disturbed zones and differ in velocity levels from the far field velocity field 602. The near-wellbore velocity concentration zones 608 indicate near-wellbore velocity fields that are relatively less than in magnitude than the far field velocity fields, and the near-wellbore velocity concentration zones 610 indicate near-wellbore velocity fields that are relatively higher in magnitude than the far field velocity fields. Rings 604 and 606 indicate a range of DOI and/or other downhole tool response properties that specify a measuring distance for a specific acoustic downhole measuring tool. Specifically, ring 606 indicates a minimum DOI and ring 604 indicates a maximum DOI. The area between rings 604 and 606 may indicate an uncertainty range on whether the concentration of near-wellbore velocity fields are affected by the near-wellbore velocity concentration zones 610 and 612. Downhole tool responses with a DOI that is equal to or less than ring 606 may be flagged (e.g., method 300 at block 312) as being affected by the near-wellbore velocity concentration zones 608 and 610 and DOI that is equal to or greater than ring 604 may not be flagged as being affected by the near-wellbore velocity concentration zones 608 and 610. Other embodiments of method 300 at block 312 may flag areas where ring 604 is equal to or less than the near-wellbore velocity concentration zones 608 and 610.

FIG. 7 is an illustration of an embodiment of a DOI vs. near-wellbore perturbed velocity zone output display 700 at multiple depths. In one embodiment, the DOI vs. near-wellbore perturbed velocity zone output display 700 may be displayed on a GUI of a computing system as an output of block 310 of method 300. The DOI vs. near-wellbore perturbed velocity zone output display 700 has an X-axis 702 that represents the distance in inches from the center of the wellbore, and a Y-axis 704 that represents the measured depth for the wellbore. FIG. 7 illustrates that regions 708 are depths that the near-wellbore disturbed zones fall below the minimum DOI and regions 706 are depths that the near-wellbore disturbed zones are greater than the minimum DOI. In one embodiment, regions 706 may be areas that method 300 may flag in block 312. Other embodiments of method 300 at block 312 may flag areas where the near-wellbore velocity disturb zones exceed the maximum DOI.

Figure 8:
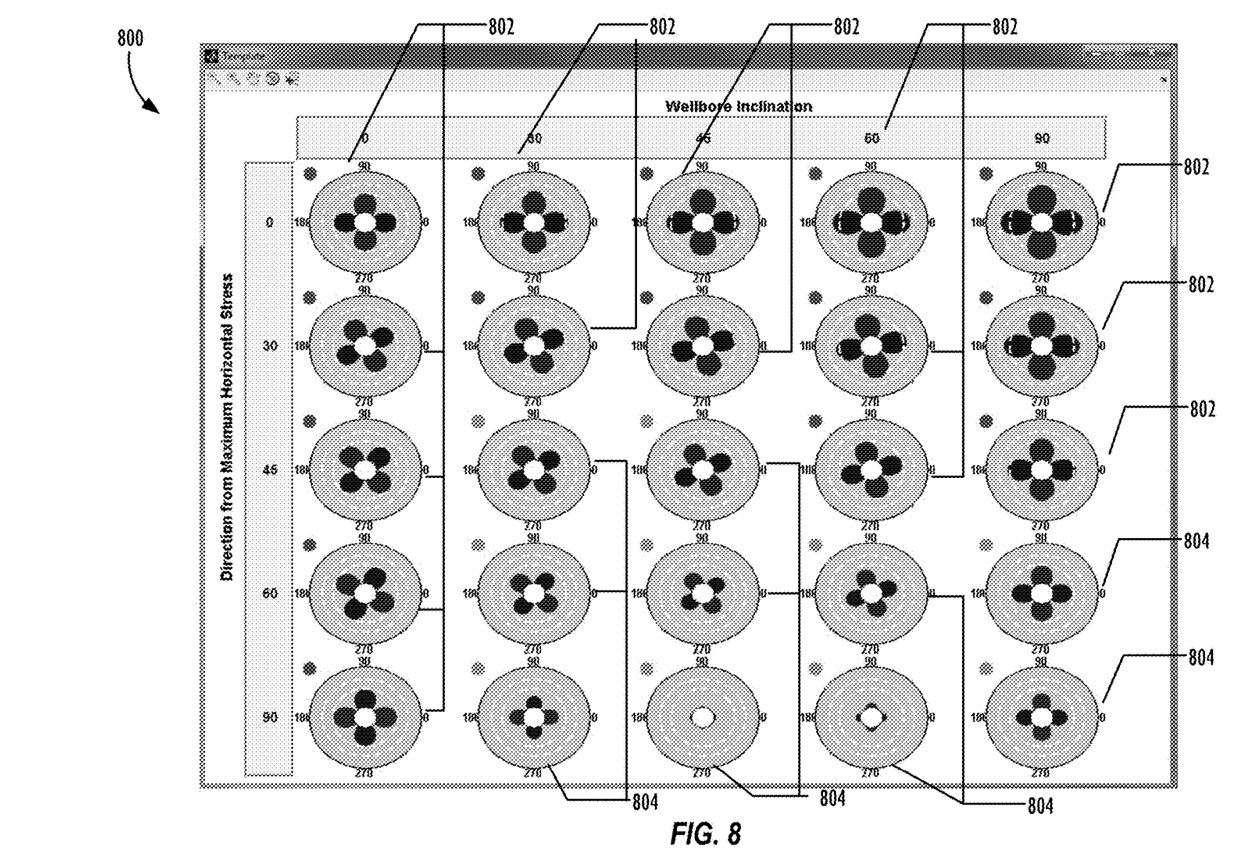
FIG. 8 is an illustration of an embodiment of an operational guideline output.

FIG. 8 is an illustration of an embodiment of an operational guideline output 800. In one embodiment, the operational guideline output 800 may be displayed on a GUI of a computing system as a lookup table that corresponds block 314 of method 300. Thus, an accurate characterization of the near field stresses around a wellbore will help identify potential impact stresses on the recorded downhole tool response. FIG. 8 depicts the effects of wellbore inclination and azimuth on near-wellbore stress field concentration under a typical faulting stress regime. As the inclination and azimuth of wellbore changes, both extent and orientation of the near-wellbore stress field concentration varies. This would affect the extent and magnitude of velocity field around the wellbore. Using FIG. 8 as an example, a downhole acoustic measuring tool in a vertical wellbore (e.g., well inclination from vertical is about zero degrees) may be affected relatively less by near-wellbore stress field concentration when compared to a downhole acoustic measuring tool in a horizontal wellbore (e.g., well inclination from vertical is about 90 degrees) under the same in-situ stress field conditions.

In FIG. 8, conditions with a relatively higher chance of the downhole acoustic tool response being affected by near-wellbore stress field concentration are marked as blocks 802 while the downhole acoustic tool response not affected by the near-wellbore stress field concentration are marked as blocks 804. FIG. 8 also illustrates that the chance of the downhole tool response being affected by the near field stress concentration is minimized for about a 45 degree wellbore inclination drilled towards minimum in-situ horizontal stress, which is about 90 degrees from $SH_{max}$. In other cases, the location of stress compression in the near-wellbore stress field rotates around the wellbore and vary depending on the inclination and azimuth of the wellbore. The implication of operational guideline output 800 is that the acoustic downhole measuring tools may record fast and/or slow velocities in different magnitudes and orientations around the wellbore depending on the DOI and inclination and/or azimuth of the wellbore. Other embodiments of operational guideline output 800 may comprise other factors, such as formation properties, in-situ stress fields, and other wellbore geometry that affect near-wellbore stress field and acoustic downhole tool responses.

The operational guideline output 800 can be useful in job planning by predicting the depth of sensitivity for acoustic downhole tool responses, subsurface formation, and wellbore trajectory. Based on this information, an operator may know whether to expect that the sonic data will be from the near wellbore, far wellbore, or both. For example, using operational guideline output 800, an operator may predict whether the shear anisotropy measurements will be dominated by stress-induced effects or intrinsic anisotropy. If an operator uses the azimuthal shear velocities in real-time or near real-time to optimize fracturing, an operator may need to know whether the operator is detecting near-wellbore anisotropy, which would probably not add to production as the stress effects do not extend beyond the shallow perturbed zone, or if the tool data indicate variations in the natural stress field that will fed into fracture design and optimization process.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory machine readable medium on which instructions are stored, comprising instructions that when executed cause a machine for evaluating a subsurface geological formation for extraction of hydrocarbon from at least one wellbore in the subsurface geological formation to:
receive a plurality of input data, the input data comprising: (a) information corresponding to the at least one wellbore of the subsurface geological formation, and (b) at least one downhole acoustic tool response property of a downhole acoustic tool;
construct a geomechanical model based at least in part on the input data;
create, based at least in part on the geomechanical model, at least one near-field versus far-field stress distribution that corresponds to the at least one wellbore;
create at least one near-wellbore versus far-field velocity distribution based at least in part on the at least one near-field versus far-field stress distribution;
compare the at least one near-field versus far-field velocity distribution with the at least one downhole acoustic tool response property, the at least one downhole acoustic tool response property indicating a penetration depth of the downhole acoustic tool for the subsurface geological formation;
detect, from the comparison, areas where the at least one downhole acoustic tool response property stays within a near-wellbore velocity field affected by near-wellbore stress field concentration to identify an operational guideline output; and
operate the downhole acoustic tool to measure acoustic responses in the at least one wellbore of the subsurface geological formation, wherein the detected areas identified in the operational guideline output predict that the measured acoustic responses at least in the detected areas are dominated by either stress-induced effects or intrinsic anisotropy characterizing the subsurface geological formation.

2. The non-transitory machine readable medium of claim 1, wherein the instructions, when executed, causes the machine to perform an acousto-elastic analysis to create the at least one near wellbore versus far-field velocity distribution.

3. The non-transitory machine readable medium of claim 2, wherein the acousto-elastic analysis is performed as an analytical or numerical solution.

4. The non-transitory machine readable medium of claim 2, the acousto-elastic analysis is performed by importing stress fields from the geomechanical model into an analytical or numerical model.

5. The non-transitory machine readable medium of claim 2, wherein the instructions, when executed, cause the machine to plot along the wellbore a plurality of synthetic stresses and a plurality of velocities determined from the acousto-elastic analysis.

6. The non-transitory machine readable medium of claim 1, wherein the instructions, when executed, causes the machine to construct an operational guideline that displays effects of the near-wellbore velocity field under a plurality of geometries of the wellbore.

7. The non-transitory machine readable medium of claim 6, wherein the operational guideline is a lookup table that accounts for at least one of the following: a plurality of inclinations for the at least one wellbore, rock mechanical properties, in-situ stress fields, and a plurality of azimuth for the at least one wellbore.

8. The non-transitory machine readable medium of claim 1, wherein the at least one downhole acoustic tool response property is a depth of investigation of the downhole acoustic tool.

9. The non-transitory machine readable medium of claim 1, wherein the information of the input data comprises data that accounts for at least one of the following: a plasticity effect of the subsurface geological formation, a poro-elastic effect, and a thermo-elastic effect.

10. A system for evaluating a subsurface geological formation for extraction of hydrocarbon from at least one wellbore in the subsurface geological formation, the system comprising:
   at least one processor; and
   a memory, coupled to the at least one processor, and comprises instructions,
      when executed by the at least one processor cause the system to:
      receive a plurality of input data, the input data comprising: (a) information corresponding to the at least one wellbore of a subsurface geological formation, and (b) at least one downhole acoustic tool response property of a downhole acoustic tool;
      construct a geomechanical model based at least in part on the input data;
      determine a plurality of near-wellbore stress fields and a plurality of far-field stress fields that correspond to the at least one wellbore based at least in part on the geomechanical model;
      determine a plurality of near-wellbore velocity fields and far-field velocity fields based at least in part on the near-wellbore stress fields and far-field stress fields;
      compare the near-wellbore velocity fields with the at least one downhole acoustic tool response property, the at least one downhole acoustic tool response property specifying a distance on how far the downhole acoustic tool measures into the subsurface geological formation;
      detect, from the comparison, areas where the at least one downhole acoustic tool response property stays within the near-wellbore velocity fields affected by near-wellbore stress field concentration to identify an operational guideline output; and
      operate the downhole acoustic tool to measure acoustic responses in the at least one wellbore of the subsurface geological formation,
      wherein the detected areas identified in the operational guideline output predict that the measured acoustic responses at least in the detected areas are dominated by either stress-induced effects or intrinsic anisotropy characterizing the subsurface geological formation.

11. The system of claim 10, wherein the at least one downhole acoustic tool response property is a depth of investigation of the downhole acoustic tool.

12. The system of claim 10, wherein the information of the input data comprises data that accounts for at least one of the following: a plasticity effect of the subsurface geological formation, a poro-elastic effect, and a thermo-elastic effect.

13. The system of claim 10, wherein the instructions, when executed by the processor, cause the system to perform an acousto-elastic analysis to create the at least one near wellbore versus far-field velocity distribution.

14. The system of claim 13, wherein the acousto-elastic analysis is performed using either an analytical solution or by importing stress fields from the geomechanical model into a numerical model.

15. The system of claim 13, wherein the instructions, when executed by the processor, cause the system to plot along the wellbore a plurality of synthetic stresses and a plurality of velocities determined from the acousto-elastic analysis.

16. The system of claim 10, when executed by the processor, causes the system to construct an operational guideline that displays effects of the near-wellbore velocity fields under a plurality of geometries of the at least one wellbore.

17. The system of claim 16, wherein the operational guideline is a lookup table that accounts for a plurality of inclinations for the at least one wellbore and a plurality of azimuth for the at least one wellbore.

18. A method for evaluating a subsurface geological formation for extraction of hydrocarbon from at least one wellbore in the subsurface geological formation, the method comprising:
   receiving, using a specially programmed computing system, a plurality of input data, the input data comprising: (a) information corresponding to the at least one wellbore of the subsurface geological formation, and (b) at least one downhole acoustic tool response property of a downhole acoustic tool;
   constructing, using the specially programmed computing system, a geomechanical model based at least in part on the input data;
   creating, based at least in part on the geomechanical model using the specially programmed computing system, at least one near-field versus far-field stress distribution that corresponds to the at least one wellbore;

creating, using the specially programmed computing system, at least one near wellbore versus far-field velocity distribution based at least in part on the at least one near-field versus far-field stress distribution;

comparing, using the specially programmed computing system, the at least one near-field versus far-field velocity distribution with the at least one downhole acoustic tool response property, the at least one downhole acoustic tool response property indicating a penetration depth of the downhole acoustic tool for the subsurface geological formation;

detecting, from the comparison using the specially programmed computing system, areas where the downhole acoustic tool response property stays within a near-wellbore velocity field affected by near-wellbore stress field concentration to identify an operational guideline output; and operating the downhole acoustic tool to measure acoustic responses in the at least one wellbore of the subsurface geological formation, wherein the detected areas identified in the operational guideline output predict that the measured acoustic responses at least in the detected areas are dominated by either stress-induced effects or intrinsic anisotropy characterizing the subsurface geological formation.

19. The method of claim 18, further comprising:

performing, using the specially programmed computing system, an acousto-elastic analysis to create the at least one near wellbore versus far-field velocity distribution;

plotting, using the specially programmed computing system, along the at least one wellbore a plurality of synthetic stresses and a plurality of velocities determined from the acousto-elastic analysis; and constructing, using the specially programmed computing system, an operational guideline that displays effects of the near-wellbore velocity field under a plurality of geometries of the at least one wellbore.

20. The method of claim 19, wherein the operational guideline is a lookup table that accounts for a plurality of inclinations for the at least one wellbore and a plurality of azimuth for the wellbore.

21. The method of claim 18, wherein operating the downhole acoustic tool having the at least one downhole acoustic tool response property in the at least one wellbore to measure the acoustic responses in the subsurface geological formation comprises at least one of: operating the downhole acoustic tool while drilling the at least one wellbore; and operating the downhole acoustic tool during a wireline operation.

22. The method of claim 18, wherein receiving the plurality of input data comprises receiving one or more of: pre-existing well data, a reservoir property, a rock property, a geomechanical property, measurement data from another type of tool, pore pressure of the at least one wellbore, wellbore geometry, inclination of the at least one wellbore, azimuth of the at least one wellbore, data obtained from geomechanical analysis, a plasticity of the subsurface geological formation, a horizontal transverse isotropic character of the subsurface geological formation, a vertical transverse isotropy character of the subsurface geological formation, a poro-elastic effect of the subsurface geological formation, a thermo-elastic effect of the subsurface geological formation, a type of the downhole acoustic tool, and a depth of investigation of the downhole acoustic tool.

* * * * *